June 18, 1940.  H. B. FLOWER  2,204,584
METHOD AND APPARATUS FOR SHELLFISH DREDGING
Filed Dec. 23, 1936  3 Sheets-Sheet 1
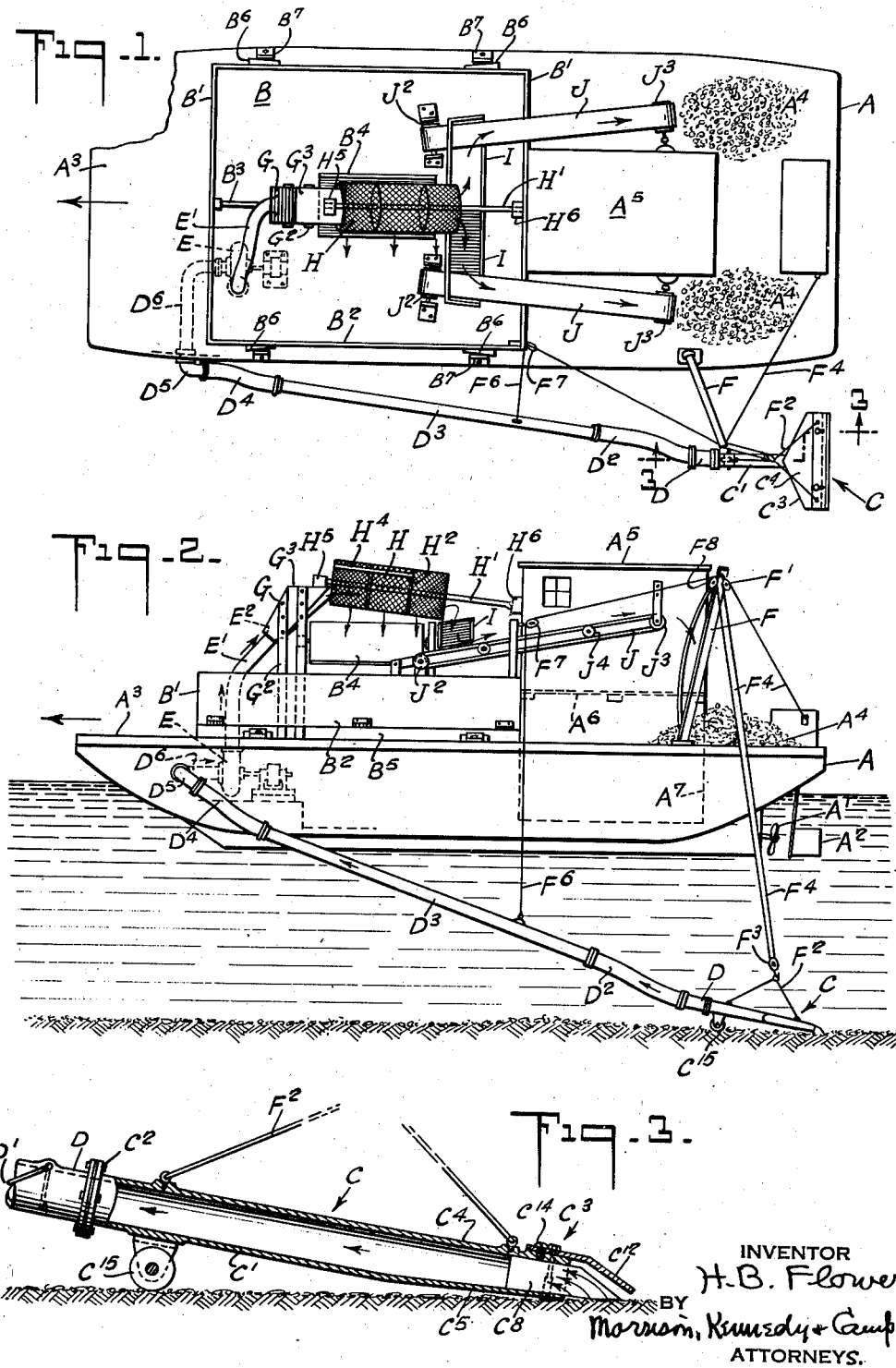

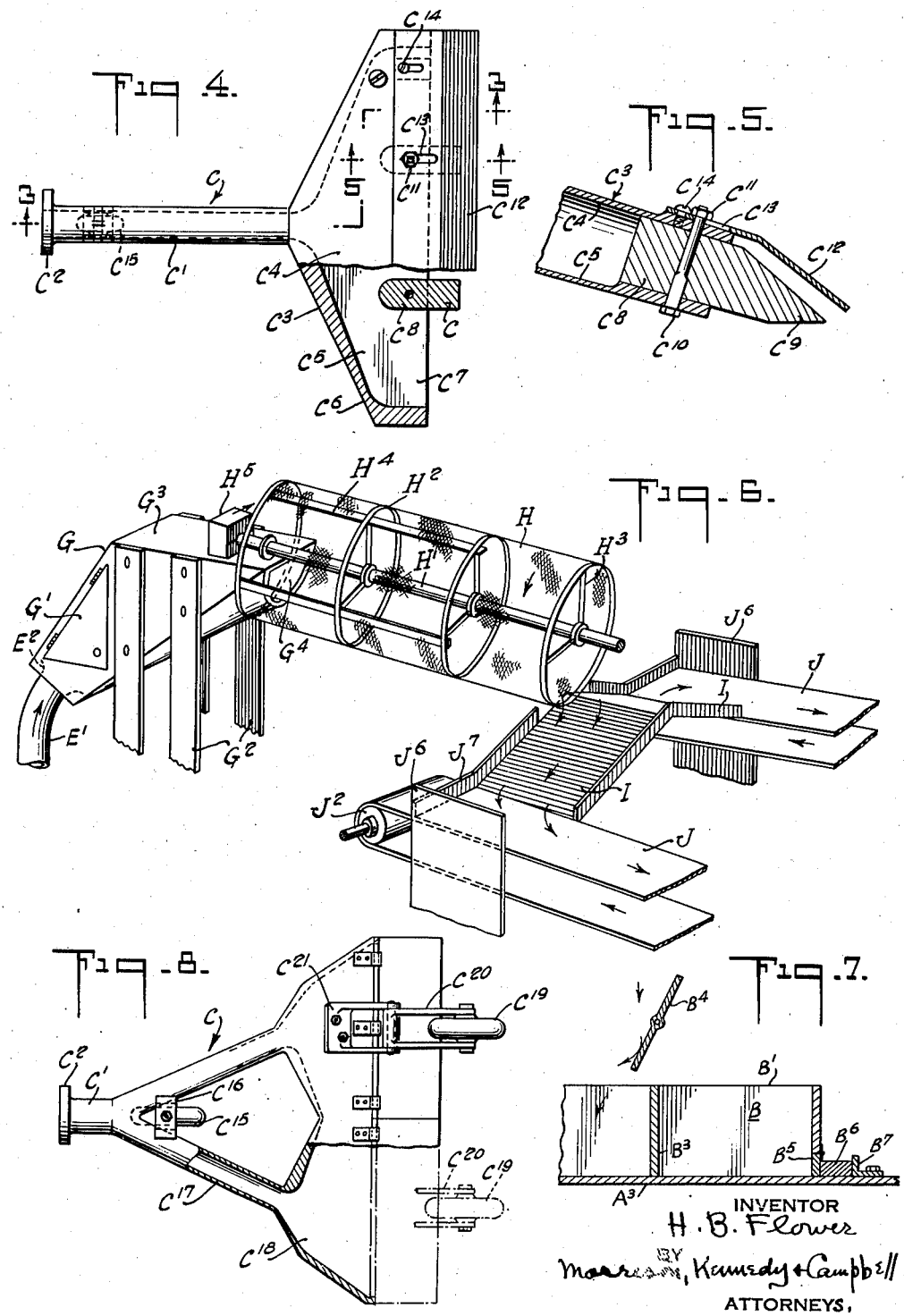

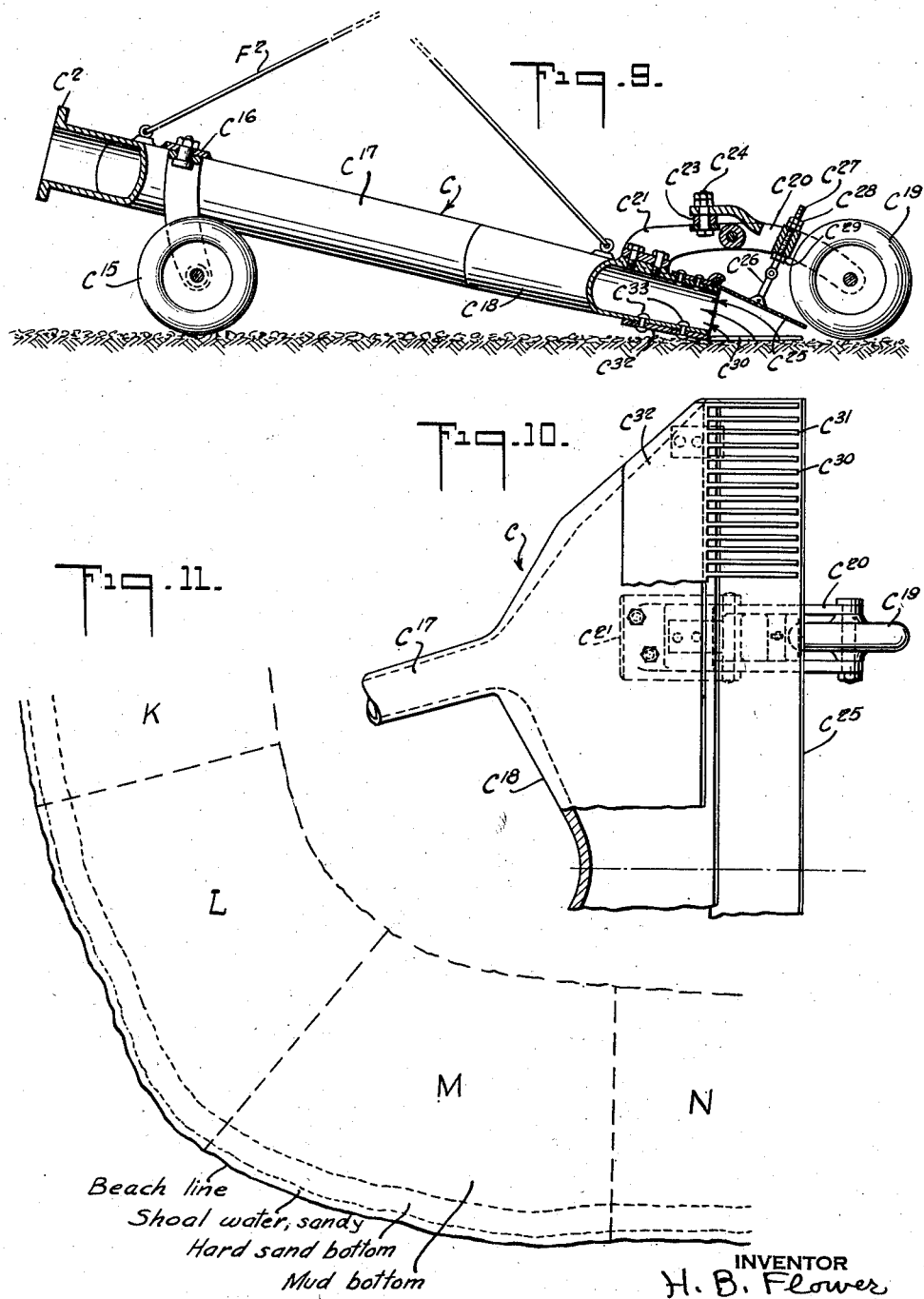

Patented June 18, 1940

2,204,584

UNITED STATES PATENT OFFICE 2,204,584

METHOD AND APPARATUS FOR SHELLFISH DREDGING

Harry Butler Flower, Bayville, N. Y.

Application December 23, 1936, Serial No. 117,306

14 Claims. (Cl. 262—2)

This invention relates to shellfish cultivation, and involves an improved system of cultivation or culture of oysters, clams or other shellfish; including both the art or method of operation and the apparatus or means for performing the same.

The general object of the present invention is the improvement in efficiency and convenience of both method of and apparatus for shellfish cultivation, and to increase the quantity and quality of crop or output. A further object is to afford improved operation and results in the handling of the shellfish, the preparing of the beds, planting or seeding thereof, and reduction or elimination of vermin and other causes of deterioration and loss. Other objects and advantages will be explained in the hereinafter following description of illustrative embodiments of the invention or will be understood to those conversant with the subject.

To the attainment of such objects and advantages the invention consists in the novel art, system or method of cultivation or culture of oysters or other shellfish, and the novel apparatus therefor, as well as the novel features of procedure, treatment, operation, combination and construction herein illustrated or described. The improvements will be described particularly in relation to the cultivation of oysters in a system of submarine beds, but will be understood as applicable to the cultivation of claims or various other shellfish to which the invention is adaptable.

The method involves the employment of hydraulic dredging for lifting or removing from the bed or bottom, oysters, vermin, refuse etc., by sucking them through nozzle and ascending passage, as will be described more fully, in distinction to the prevailing use of mechanical or drag-scoop dredging, thus greatly improving and simplifying the method and increasing the quality and output of product.

In the accompanying drawings

Fig. 1 is a top plan view or layout of a dredge boat carrying operating means constituting an illustrative embodiment of the present invention in its apparatus aspect, and adapted to carrying out the method aspect of the invention.

Fig. 2 is a left or port side elevation of the apparatus or dredger shown in Fig. 1, with the dredging or suction nozzle indicated in its operating position, being drawn along the bottom.

Fig. 3 is an enlarged longitudinal vertical sectional view of the dredging nozzle of Figs. 1 and 2.

Fig. 4 is a top plan view, partly in horizontal section, of the dredger nozzle of Figs. 1 to 3.

Fig. 5, on a larger scale, is a longitudinal vertical section view of the suction end of the nozzles of Figs. 3 and 4.

Fig. 6 is a detached perspective view of the more important apparatus elements mounted above the deck of the dredge vessel of Figs. 1 and 2.

Fig. 7 is a detail transverse section view of part of the receiving tank on the deck of the vessel and parts adjacent.

Fig. 8 is a top plan view, partly in section, of a modified or second form of dredge nozzle.

Fig. 9, on a larger scale, is a left elevation view of the nozzle of Fig. 8, shown partly in longitudinal section.

Fig. 10 is a partial bottom plan view of the nozzle of Figs. 8 and 9.

Fig. 11 is a diagrammatic plan view of a water field or oyster bank comprising a series of sections of oyster beds shown as representative of practical conditions, for the convenient explanation of the art or method of the present invention.

For convenience the apparatus features of the invention will be first described and thereafter the method features. In general the apparatus comprises a floating vessel, boat or barge A, carrying dredging means and other equipment for operations on and treatment of oyster beds and the like, and adapted to operate by traversing the areas to be treated, either by being towed or under its own power. The dredge boat carries some or all of the following elements: a receiving tank B on the vessel, preferably atop its flat deck; a dredging or suction nozzle C adapted to be drawn over or moved along the sea bottom or floor alongside the vessel with the travel of the latter; the nozzle being of extended length of mouth or entrance, to operate upon a wide strip of bottom, and having a means or tackle to lift and lower it; and a dredging or suction pump E on the vessel having flexible pipe connections with the nozzles. The apparatus preferably includes also a delivery chamber G mounted at an elevated point higher than the receiving tank and adapted to receive the water and entrained materials from the pump and to reduce the flow velocity thereof; a rotating or other moving screen H to which the pump or chamber delivers, operative to pass all fine materials and pumped water down into the receiving tank below but to carry along and discharge at a separate point all coarse or large materials, such as oysters, oyster shells, large refuse and the like according to the mesh of the screen; and preferably a conveying means J arranged for receiving such larger materials from the screen and causing their delivery to a desired receptacle or position, as upon a designated part of the vessel deck.

In Figs. 1 and 2 is shown the dredger boat or vessel A in the nature of a barge but preferably carrying its own power, an engine being understood but not shown, the drawings indicating a propeller A' and rudder $A^2$. The deck $A^3$ of the dredger may be flat and at its after end, port and starboard, are deck spaces or receptacles $A^4$ to receive the coarser materials delivered thereto as will be described. A pilot of control house $A^5$ is shown having preferably an elevated floor $A^6$ over the engine room $A^7$; and from room $A^5$ the operator may effect control of the engine, propeller and rudder in usual manner, and of the elements of hydraulic dredging apparatus to be described.

On top of the deck $A^3$ is shown the large receiving tank B forward of the pilot house, adapted to receive the sand and other fine screenings along with the water from the screen above. The water runs away leaving the wet screenings; for example, this settling tank may be arranged for water overflow at its forward or other edge furthest removed from the receiving point, so that the received solids may settle before reaching the edge or spillway and so be restrained from return to the oyster bed. The tank is shown built of vertical end walls B' and side walls $B^2$. A longitudinal partition $B^3$ is shown dividing the tank into port and starboard compartments. In order to balance the load received in the tank from the screen there is shown a deflecting means comprising a swinging flap or deflector $B^4$ hinged above the partition $B^3$ and adapted at will to be set at either slant thereby to direct the delivered material to one side or the other of the partition wall; see Fig. 7. At the foot of each side wall of the tank the lowermost plank $B^5$ is shown as swingable outwardly, being hinged to the wall at its upper edge, thus permitting the tank to be opened at the two sides for washing out completely its two compartments, when and where desired, as by a hose, thus to dump overboard its contents. To hold the swinging gate B in closed position there is shown a block or wedge $B^6$ removably interposed between the gate and a fixed abutment or cleat $B^7$ arranged adjacently on the deck.

The dredging nozzle C is a suction device shown as having a longitudinal stem or neck C' with a coupling flange $C^2$ at its front end and an enlarged suction head $C^3$, shown in detail in Figs. 3 to 5. This head is shown as built up of bent or welded parts including a top plate $C^4$, bottom plate $C^5$ and shaped sides $C^6$, enclosing a head space which converges from a large mouth to the stem C'.

The nozzle mouth $C^7$ is shown as having an unusually great horizontal length, that is, measured transversely to the forward direction of travel; the head converging from the long mouth to the stem. For example, there has been successfully used a suction nozzle having a mouth 8 feet long, with a width or height of opening of about 5 inches, delivering to a 6 inch neck and piping. The top and bottom plates of the head are held spaced apart as by a system of spacing blocks $C^8$, of which two are shown in Fig. 4, each having the same height as the mouth width.

These blocks preferably are considerably longer than their height, being shown formed with a rearward extension $C^9$ forming a skid, adapted to slide along bearing upon the sea floor and thus take the major part of the wear of the nozzle. The combined spacing block $C^8$ and skid $C^9$ as shown in Figs. 4 and 5, may be shaped to maintain effective flow into the nozzle and prevent clogging of solid materials behind the block. This device is shown as secured in place by a holding bolt $C^{10}$ having an underneath head and at its top end a holding nut $C^{11}$.

As a useful auxiliary device the nozzle head is shown as provided with an overhanging lip or apron $C^{12}$, in the nature of a closed wall or plate, which may extend the full length of the mouth, with its extremity extended downwardly in proximity to the sea bottom, thus to compel inflow of water under the apron to the nozzle, and thus the efficient indrawing of solid matters from the bottom as desired. The clearance of the apron $C^{12}$ above the bottom may be regulated by means of slots $C^{13}$ formed in the apron plate, the bolts $C^{10}$ extending through such slots, and the nut $C^{11}$ holding the adjustment. Near its ends the apron is additionally secured to the head by screws $C^{14}$ entering similar slots $C^{13}$.

The nozzle C is preferably maintained at a substantial tilt or incline from the bottom, for upslanting inflow, and for this purpose there is shown mounted under the front end of the nozzle stem a bracket carrying a supporting wheel $C^{15}$, these being of the proper dimension to give the desired tilt, such as that shown in Fig. 3.

A modified or second form of nozzle is shown in Figs. 8 to 10 containing several variations. Thus, the front or elevating wheel $C^{15}$ is mounted on a swivel device $C^{16}$ so that it can swing with the turning of the apparatus. This nozzle is of improved structure for a mouth of extended length, having a plurality of hollow stems $C^{17}$, two being shown leading from the two sides of the double head $C^{18}$. The double head delivers the sucked material to the hollow stems which deliver to the main stem C' carrying coupling flange $C^2$.

The nozzle of Figs. 8 to 10 is shown as having spaced apart rear wheels $C^{19}$, bearing on the bottom, and dispensing with the need of the skids already described. These wheels preferably carry inflated rubber tires, moving easily over the bottom and giving a definite lift or buoyance, smoothing the operations. Two such rear wheels are shown each mounted in a fork $C^{20}$ which is pivoted to a bracket $C^{21}$ mounted on the head top plate. To hold the fork in definite relation to the bracket, and thereby the wheel in predetermined relation to the mouth, an adjusting device is shown, one of these parts, namely the fork, being provided with an extension arm $C^{22}$ reaching over the bracket, with an interchangeable block $C^{23}$ inserted between them and a securing bolt $C^{24}$ passing through the extension, the block and a part of the bracket; so that by interchanging the block the relative height of the wheel can be changed, and thereby can be adjusted the clearance of the nozzle above or its relation to the sea bottom.

In place of the slidably adjustable apron $C^{12}$ the second form of nozzle contains a swinging apron $C^{25}$. The apron is shown in sections, two of them in line, each hinged to the nozzle top plate and each held in its desired adjustment by a link $C^{26}$, connected with a bolt $C^{27}$ passing through a part of the fork $C^{20}$, with attaching nuts $C^{28}$ above and $C^{29}$ below. By these devices not only can the relation of the nozzle to the sea floor be predetermined, but also the relation thereto of the apron which controls the intake of water, sand etc. to the nozzle mouth.

An additional element of advantage is a guard or comb $C^{30}$ shown in Fig. 9 and the bottom view of Fig. 10. This is in the nature of a strainer or grating consisting of steel rods $C^{31}$ welded to a backing plate $C^{32}$ and spaced fairly close so as to exclude the admission of any but fine matters as the nozzle is drawn over the sea bottom, e. g. to lift sand or mud without taking oysters or shells. Bolts $C^{33}$ hold the guard in place in a manner permitting its removal and interchange for another guard of different spacing; for this an easily removable type of rivet $C^{33}$ may be used. The guard can be omitted entirely when it is desired to remove coarse as well as fine materials from the bottom.

The connections between the nozzle and the apparatus on the dredge boat may be as follows. A check valve D is shown attached to the flange $C^2$ of the nozzle. The check valve is a known fitting having an interior swinging vane yieldable for the inflow of water and material, but contacting a stop to prevent outflow. In order however to open and hold open the check valve for draining the pipes there is shown an exterior handle D' connected to the pivot pin of the valve flap. A rope may be attached to swing the handle and flap.

Extending at an upward slant from the check valve is shown a flexible section $D^2$ of pipe or hose of relatively short length, this in turn being coupled to a longer section $D^3$ of rigid pipe, above which is another flexible hose section $D^4$ coupled to the intake fitting $D^5$. This fitting may be in the form of an elbow, entering the vessel near its bow end and preferably slightly above the water level. From the intake $D^5$ is an interior pipe $D^6$ extending to the dredge pump.

The dredge pump E is shown as below deck near the bow of the boat. It may be of any type suitable for suction pumping of water carrying sand, mud, shells, refuse, etc.; such as a pump on the ejector or induced-flow principle. It is conventionally shown as of the centrifugal type, power driven, with its inlet central and its discharge peripheral. The suction pipe $D^6$ leads to the pump inlet and the pump discharge is by a pipe E' shown extending upwardly to where its flared extremity $E^2$ enters the delivery chamber to be described. A suitable priming means or valve for initial starting of the pump is to be understood, and it may be of conventional type; for example a water connection to fill the pump and the pipes below it while the check valve D is closed.

The described combination of long-mouth nozzle, with upslanting pipes to the dredging pump, constitutes a very effective arrangement for the purposes of this invention. Thus in a successful demonstration, with a nozzle 8 feet long, the pump E, of 6 inch size, fed by 6 inch pipe, upon a dredge boat about 50 feet long, has shown the ability to deliver from 6 to 20 bushels more or less per minute of oysters, shells and other coarse solids not passing through the screen to be described, in addition to quantities of sand and fine screenings and the water in which these have been carried through the described connections and pump.

For raising and lowering the nozzle C there is shown a davit F overhanging the water and braced by suitable stay wires. The following hoisting tackle is illustrative. The davit carries a pulley block F'. The nozzle is suspended by a three-point halter or sling $F^2$, and at the junction of its three ropes is arranged a pulley block $F^3$. A hoisting cable or rope $F^4$ may be passed between the blocks for any desired multiplication of power, the extremity of the rope being accessible for hoisting the nozzle, for example, passing below deck to a power winch. Auxiliary to these hoisting elements is shown a hoisting rope $F^6$ on the pipe section $D^3$, the rope passing over a pulley $F^7$. A specific arrangement is shown wherein the rope $F^4$ is a continuation of the rope $F^6$. From pulley $F^7$ the rope passes over a pulley $F^8$ on davit F, thence down to pulley $F^3$ and up to pulley F' and to the winch. Both the nozzle and pipe are lifted by the one rope, with the stronger lift on the heavier.

The rising discharge pipe E' from the dredge pump is flared at its end to widen the flow channel and thus commence a reduction of velocity, which is continued by the provision of a delivery chamber G, at a high point, in which the pipe E' discharges. The chamber has a substantially flared shape, with its outlet several times the area of its inlet, thus to slow down the travel velocity of the pumped materials before they are delivered to the screen. The chamber G is shown as provided with a side opening door G' for access to clear obstructions, prime the pump, etc. The chamber is suitably mounted as upon an upright supporting bracket $G^2$. The chamber is shown of a suitable form closed at the top by a wall $G^3$ and having its delivery exit $G^4$ located actually within the entrance end of the rotating screen.

The screen or separating element H of the combination is shown of the rotary type. It may be conical but is preferably cylindrical, in which case its shaft H' should slant downwardly as shown so that the coarse materials will trend away from the chamber G toward the other end of the screen. A particular construction is shown wherein the screen comprises a perforated or wire mesh cylindrical wall mounted on a system of hoops or rings $H^2$. Four hoops are shown, each being rigidly supported by a hub upon the central shaft H', with the exception of the front ring, from which the spokes have been omitted to avoid conflict with the delivery of material from chamber G into the screen. In order to stiffen and hold the front ring in position there is shown a series of longitudinal bars or braces $H^4$ extending from the front ring to two or more rings to the rear thereof. Instead of a central shaft the screen may turn in large exterior bearings, rendering the interior clear of obstruction.

The shaft H' of the rotary screen is shown as turning in a front bearing $H^5$, suitably mounted as on the top wall $G^3$ of the chamber, and in a rear bearing $H^6$ mounted on the front wall of the pilot house, and the shaft is to be understood as connected or extended, as within the pilot house, for purposes of power drive of the screen from the engine.

The movable screen H is preferably interchangeable as to size of mesh. A suitable mesh to retain oysters, starfish and matters of similar or larger size is from ¼ to ½ inch, which releases sand, pebbles and other fine screenings. The slanting screen, for example of 2½ feet diameter and 6 feet length or larger, affords by its rotation a very effective screening action and separation, aided by the accompanying delivery of water. The screen may be removed and replaced, for example by a mesh between 1 and 2 inch size, or even larger, for special purposes in oyster cultivation. The rotation speed may be varied at will by the provision of a conventional transmission gear or belt shift, so as effectively to separate the fines from the coarse materials before the latter reach the lower end.

As the pumped materials pass down the incline of the screen all of the water and sand and other fine screenings pass through the mesh into the receiving tank below while oysters, oystershells, starfish and various large materials and refuse pass on down the length of the screen and are delivered at its rear end. At this point there may be provided a deflector tending to divert the discharging coarse materials either toward port or starboard, to be received upon a steep chute I at the port side or a similar chute at the starboard side. This affords a balanced distribution to the two sides; or selective distribution can be attained by a lateral shift of the screen. For this purpose one or both bearings $H^5$ or $H^6$ may be shiftable; for example, the bearing $H^5$ rests by gravity on the wall $G^3$ and may be shifted right or left at will.

The materials passing down the respective chutes are received upon conveying belts J power driven, and slanted upwardly, one at each side so that the materials received on each of the belts are conveyed to an elevated point, preferably rearward, and discharged as Figs. 1 and 2 show upon the receiving areas $A^4$ of the deck, near the stern of the dredge. The elevated height of discharge of each belt allows for building up a conical pile of material to the full height thereof.

Each of the conveying belts $J^3$ and $J^4$ has a guiding pulley $J^2$ at its front end and a driving pulley $J^3$ at its rear end, the latter being shown mounted upon the side of the pilot house and being arranged for its shaft to receive power from the engine. Between the front and rear pulleys may be several idler pulleys $J^4$. The belts are regulable in speed to coordinate with the rate of delivery from the screen.

In order to confine upon each conveyor belt the materials received from its chute there is shown a vertical striking plate or wall $J^6$ arranged at the outer or opposite side of the conveyor to prevent the materials being carried across and from the belt. Also, the rear side wall of the chute is continued as a wall $J^7$ to the rear edge of the striking plate $J^9$ for confining the material from passing off in that direction.

The art or method of shellfish cultivation or culture of this invention may be carried on with the aid of the described apparatus, or by other means adapted thereto; and is characterized in one aspect in that the removals, cleanings and other operations upon the beds or bottoms are performed by hydraulic or suction action, that is, by a forced intake of water into a nozzle or passage applied systematically to the bottom for the entrainment and carrying upward of the materials to a place of deposit above water, as upon the deck of a dredge boat. Mechanical dragging, scooping and the like are obviated, with their uncertain control and tendency to damage, and instead the water is employed as a conveyor to take up from the bottom and carry above water the removed materials. Thus, the suction nozzle, of relatively great length transverse to travel, operates upon a wide swath or strip of bottom by the drawing of the nozzle methodically over the area to be treated, as by the advancing travel of the vessel, while suction and upflow are working by the action of the dredge pump. An illustrative method of operation may be as follows.

The oyster farm or bank shown in Fig. 11, taken as a typical example, is considered as subdivided into a series of convenient sections K, L, M, N and so forth, each of an area of from 15 to 50 acres, more or less, and which may be prepared and cultivated in succession or rotation, for example substantially as will be described. Each section may comprise a shoalwater strip or portion adjacent the beach line, usually sandy, and accessible by the vessel at high water, and therebeyond a strip or portion having a hard sand bottom under deeper water, always navigable to the dredgeboat, and outwardly thereof the third or main portion of the section, frequently muddy and therefore naturally unsuitable for oyster cultivation and requiring preparation. In referring to vermin this term includes starfish, drills and boring sponges. Fine screenings from the dredging may include sand, gravel, mud, drills and small refuse; coarse matters may include oysters, shells, stars and stones, sticks and other large refuse.

The method may be described commencing with the preparation of a given area, say section L. In the complete system the first step may be the preliminary treatment of the mud portion which is preferably performed as follows. Another section, as K, has been previously cleaned, perhaps over substantially its entire area, and preferably hydraulically, by the suction nozzle, adjusted near the bottom to remove all refuse and with no guard below the nozzle mouth. This material is spread over section L, being distributed selectively in a manner to overlie, and with the purpose of covering, the mud; after each loading of refuse at section K or elsewhere the dredger is directed to section L, and the collected refuse is dumped or discharged from the deck, as mechanically, and from the tank, as by washing. However oysters are not deposited on section L at this stage, any oysters removed from the previous section K being saved and deposited elsewhere, as back upon the cleaned section K.

The sand bottom portions of section L are then hydraulically dredged or suction-cleaned of refuse, and all such refuse is applied also upon the mud bottom of section L, further to cover such mud. Any and all oysters lifted from the bottom in this operation should be separated and deposited on the cleaned portions of another section, as K, along with oysters removed therefrom.

Having now partially prepared the mud bottom of section L by covering the mud by a base of refuse from various points, sections K, L and others, and having allowed time for settling thereof, the preparation is next carried further, for example as follows, to overlay a stratum of sand upon the mud and refuse. The hydraulic nozzle is readjusted to about its lowest position, close to the bottom, to enable removal of sand, and the apron is adjusted down substantially to the sand level to increase speed of water inflow and therefore effectiveness of sand removal. A harrow or scraping devices may be attached to the nozzle in front of its mouth for this operation, to loosen the sand and facilitate its removal. The dredge is then operated systematically over the sandy portions of section L, to suck up several inches of sand, particularly from the shoal portions, accessible only at high tide. Each dredge load of sand so removed is then spread systematically over the deposited refuse previously laid upon the mud portion. This sand can be supplemented by further sand from other sections or elsewhere, as needed. By this procedure the entire section L is provided with a sandy bottom suitable for oyster growth, preferably several inches thick, sufficient to support the weight of oysters.

The sand deposits on section L should be allowed to settle and harden, perhaps for several weeks. Supplementally the bottom may next be cleaned up by adjusting the nozzle somewhat above the bottom and operating the dredger for the removal of drills, starfish and other vermin, along with any soft overlying mud, but without moving the sand previously deposited, the pumping action being reduced for this purpose so as to afford only shallow action.

Section L is now ready for the planting of seed oysters over the whole or the best part of its treated area. The depth of water above the planted areas may be from 3 to 80 feet more or less. The prepared sandy bottom of the section should last for a number of years or indefinitely before new treatment is necessary. The seed oysters are allowed to have their growth for four to six years, according to requirements. From time to time the beds may be cleaned of accumulating drills, small stars and sponges, also mud and other soft settlings, by applying the guard or comb to the nozzle to prevent lifting the oysters, and operating thus for removing the vermin. When the crop is matured the dredge is used to collect by hydraulic suction the oysters from the section bottom, and to separate them from sand, screenings etc., for shipment to market, or for transplanting from section to section, which can of course be done at any stage of growth. In taking up oysters an advantageous action occurs in that clusters of oysters are found to be broken apart in rolling through the pipes and pump, thus separating them without substantial breakage or loss.

The refuse and other materials that were removed from section L may have been carried to and deposited upon section M, and section M next in order or rotation may be treated and prepared and sowed similarly to section L. Thereafter section N may be treated, and so on, until in due time, perhaps after many years, the operations will have come back to section L, for repreparation and planting to whatever extent may be necessary.

In cleaning refuse and vermin from a section or area, to be shifted and distributed upon another area, this may be done indirectly. Thus, frequently, it is convenient to deposit ashore the collected matters and leave them there until all vermin are killed or for other convenient period, subsequently carrying them to the section which they are to be applied.

For artificial propagation of seed oysters a fine sand bottom is insufficient. The spat requires shells, stones or at least gravel on which to settle and commence development. Particular beds may be designated for collecting spat and these provided with a layer of shells etc. on top of the sand in a favorable area. When the spat adheres it commences growth and thus a source of seed oysters is provided for supplying to other areas, upon clean sand beds.

The bringing up of oysters or various other matters from the bottom and depositing the same upon the vessel or deck is performed by power and substantially continuously as the dredgeboat advances. This is in contradiction to prevailing methods known to applicant. In one system the oysters are gathered intermittently by a mechanical dredge or scoop thrown overboard, dragged along until filled, and bodily hoisted aboard with its load, with haphazard action, poor efficiency and high labor cost. Other methods using rakes or tongs are purely manual.

The hose or pipe between nozzle and pump in the present invention may be the means for hauling the nozzle as it is towed systematically back and forth to traverse the area, the nozzle trailing the boat and suction treating the surface of the bottom, as by leaving a swath or strip of cleaned bottom, removing exposed solids to a limited or predetermined depth as desired. The ascending flow of water and solids is rapid, and inspection of the pumped output gives almost immediate information of the character of the bottom as a guide for conducting the operations.

The water, sucked in under the adjustable apron, entrains the loose solids and transports them through the nozzle, hose and pump to the deck. The apron may be considered as a part and extension of the top plate or wall of the nozzle, so that the effective mouth is the opening between the rear edge of the under plate and the rear edge of the apron, these two edges being separately adjustable toward and from the bottom, and the whole nozzle being held up by the skids or wheels running on the bottom.

I claim:

1. In the art of shellfish cultivation the method or step of removing various matters from the bottom or bed, as oysters or shells, or starfish or other vermin, or mud, sand etc., consisting in hydraulic dredging thereof by causing a forced flow of water into a nozzle and through an ascending passage while applying the nozzle to the bottom for the removal of such matters whereby the matters are entrained and carried up with the water flow through such passage and therefrom to a place above water as the deck of a floating vessel or dredgeboat, and there collecting and holding the solid matters.

2. Art or method as in claim 1 and wherein the water and solids are sucked into a long-mouth nozzle which by the travel thereof clears a swath or strip of bottom.

3. Art or method as in claim 1 and wherein the water and solids are sucked into a long-mouth nozzle which by the travel of a vessel is drawn or towed along to traverse a strip of bottom, the suction causing upflow through a passage for deposit and collection of solids upon the vessel.

4. In the art of oyster cultivation the method of dredging an extensive area of oyster bed from a traveling dredgeboat, consisting in continuously sucking water along with coarse and fine solids from the bed through a hydraulic nozzle of great lateral length of mouth while trailing the nozzle by the continuous travel of the dredgeboat thereby to skim off on the run a thin top stratum of solids over a wide swath of the bed while directing the dredgeboat methodically over the area of the bed, hydraulically pumping the sucked water and solids from the nozzle mouth through a passage first tapering and then ascending to an elevated point on the traveling dredgeboat and there discharging them, straining such pumped discharge to hold back and remove therefrom the oysters and other coarse solids for deposit at a separate point on the dredgeboat, receiving the descending water and fine solids in a receptacle of substantial capacity on the dredgeboat, and there accumulating the solids while permitting the water to run away, whereby such fine solids may be disposed of remotely at leisure.

5. In a dredging apparatus of the general class having a dredgeboat carrying a hydraulic dredge-pump operating between a submerged suction pipe and a pressure pipe disposed for elevated discharge of pumped water and solids, the combination, adapted for shellfish cultivation purposes, of the following elements: a trailing suction nozzle from which the pump suction pipe leads upwardly, and having a mouth of great lateral length adapted to operate on a wide swath of shellfish bed, to remove from its surface during continuous travel a thin layer of bottom materials sucked up with the water; a driven screen arranged to receive the entire discharge from the pump pressure pipe and having separating means to restrain the shellfish and other coarse materials while passing downward all the water and fines, including drills, and with a delivery to deposit the coarse materials at a separate receiving place on the boat; and a collecting tank of large capacity arranged to receive the water and fines from the screen, and to let the received water run away while retaining the fines for remote disposal at leisure; whereby the dredgeboat may be traversed at speed methodically over an extensive area of shellfish beds, causing the wide-swath nozzle to trail continuously thereover and remove from the whole area treated a thin stratum of coarse and fine solids, sucked up on the run and, with the water, discharged upon the screen, there to be separated, the oysters and other coarse solids deposited at one place on the boat while the drills and other fines are accumulated in the tank for subsequent disposal.

6. In a dredging apparatus of the general class having a dredgeboat carrying a hydraulic dredge-pump operating between a submerged suction pipe and a pressure pipe disposed for elevated discharge of pumped water and solids, the combination, adapted for oyster cultivation purposes, of the following elements: a trailing suction nozzle from which the pump suction pipe leads upwardly, and having a mouth of great lateral length, many times the diameter of the suction pipe, and tapering frontwardly to said pipe, adapted to operate on a wide swath of oyster bed, to remove from its surface during continuous travel a thin layer of bottom materials sucked up with the water; a movable screen arranged to receive the entire discharge from the pump pressure pipe and having separating means to restrain the oysters and other coarse materials while passing downward all the water and fines, including drills, and the screen having a delivery to deposit the coarse materials at a separate receiving place on the boat; and a collecting tank of large capacity arranged to receive the water and fines from the screen, and, while letting the received water run away, to retain the fines for remote disposal at leisure.

7. The combination as in claim 6 and wherein the upflow commences with convergence and acceleration due to said tapering nozzle and wherein the elevated pump discharge is flared thereby to decelerate the flow and discharge to the screen with reduced velocity.

8. The combination as in claim 6 and wherein the collecting tank is wholly above sea level and has low washout gates openable at will for the emptying of said tank.

9. Hydraulic apparatus adapted for purposes of shellfish cultivation, the same carried upon a traveling dredgeboat operable to ply continuously over a substantial area of bottom or shellfish bed, and comprising, in combination with such traveling dredgeboat, a suction nozzle arranged and connected to be continuously dragged trailingly along the bottom by the forward travel of the dredgeboat and constructed with a laterally extended length of mouth to operate on a substantially wide swath of bottom or shellfish bed to remove progressively therefrom the thin top stratum of such bottom, a hydraulic dredge pump on the dredgeboat having its suction pipe connection extending trailingly from said nozzle and having its pressure pipe connection leading to an elevated point on the dredgeboat well above water level for discharge of the water and solids passing through the pump, an open receiving tank for solids arranged on the dredgeboat in position to receive such pump discharge and having capacity to contain a substantial quantity of the solids received in it and adapted to retain the same for remote disposal at leisure, and a driven movable screen arranged between said pump discharge pipe and said open tank to receive the pump discharge and to pass downward to said tank the water and fine screenings of the discharge and to deliver at a separate receiving point on the dredgeboat the coarse materials thereof.

10. Apparatus as claimed in claim 9 and wherein the pump pressure pipe terminates in an elevated flaring discharge chamber adapted to reduce flow velocity before discharge upon the screen of the pumped materials.

11. Apparatus as claimed in claim 9 and wherein the nozzle has its mouth of length at least six times the diameter of the suction pipe, with a nozzle chamber tapering frontwardly from such mouth to the pipe.

12. Apparatus as claimed in claim 9 and wherein the trailing nozzle has an overhanging apron plate arranged as a substantial continuation of the top wall of the nozzle and hinged thereto, with means for swingingly adjusting the apron plate to determine the intake action by controlling water inflow under the apron and thereby the intake of solids as the nozzle continuously advances.

13. Apparatus as claimed in claim 9 and wherein the nozzle has an overhanging apron plate arranged as a substantial continuation of the top wall of the nozzle and hinged thereto, with means for swingingly adjusting the apron plate to determine the intake action by controlling water inflow under the apron and thereby the intake of solids; and other means cooperatively to adjust the relation of the nozzle to the bottom.

14. Apparatus as claimed in claim 9 and wherein the nozzle has a comb-like or straining guard attached below the nozzle and extended rearwardly of the nozzle mouth and there running flatly along the bottom, and adapted to exclude oysters and other coarse solids while sucking up water and fine materials and vermin.

HARRY BUTLER FLOWER.